United States Patent [19]

Odawara et al.

[11] Patent Number: 5,223,459
[45] Date of Patent: Jun. 29, 1993

[54] WORKING SYSTEM FOR AEROPLANE

[75] Inventors: Shiro Odawara, Oomiya; Keiichi Ito, Tokyo; Kazushi Kobayashi, Asaka, all of Japan

[73] Assignee: Taikisha Ltd., Tokyo, Japan

[21] Appl. No.: 714,670

[22] Filed: Jun. 13, 1991

[30] Foreign Application Priority Data

Jun. 15, 1990 [JP] Japan .................. 2-158428

[51] Int. Cl.⁵ .......................................... E04B 1/346
[52] U.S. Cl. ...................................... 454/236; 52/64
[58] Field of Search ............... 52/64, 66–67, 52/79.1; 244/114 B, 114 R, 115, 116; 454/228, 230, 232, 233, 236, 50, 53

[56] References Cited

U.S. PATENT DOCUMENTS

| | | | |
|---|---|---|---|
| 2,744,581 | 5/1956 | Cooper | 52/64 |
| 2,992,709 | 7/1961 | McIntosh | 52/64 |
| 3,034,607 | 5/1962 | Haines | 52/64 |
| 3,739,537 | 6/1973 | Barnes | 52/64 |
| 4,004,382 | 1/1977 | Carlson | 52/64 |
| 4,694,736 | 9/1987 | Yamagata | 454/233 X |

FOREIGN PATENT DOCUMENTS 2446448 4/1976 Fed. Rep. of Germany .......... 52/64

OTHER PUBLICATIONS

Spray Coating System Earns Its Wings, *Industrial Finishing*, pp. 18–19, Sep. 1986.
Finishing Highlights, *Product Finishing*, p. 40, Jun. 1989.
BA Inaugurates Automated Paint Bay, *Aircraft Maintenance International*, p. 6, Jan. 1989.
Ventilation Vital For 747 Parts Finishing, *Heating Piping & Air Conditioning*, pp. 63–68, Jul. 1970.

Primary Examiner—Richard E. Chilcot, Jr.
Assistant Examiner—Beth A. Aubrey
Attorney, Agent, or Firm—Webb, Burden, Ziesenheim & Webb

[57] ABSTRACT

A working system for an aeroplane comprising a hangar for accommodating the aeroplane, a partition wall provided within the hangar for partitioning the hangar into a fuselage work area around a fuselage of the aeroplane and a main wing work area around a main wing, and working tables arranged in the fuselage work area. The partition wall is movable between a predetermined partitioning position and a retracted position allowing entrance and exit of the aeroplane. The working tables are movable within the fuselage work area separately from the partition wall.

16 Claims, 10 Drawing Sheets

WORKING SYSTEM FOR AEROPLANE

BACKGROUND OF THE INVENTION

1. Field of the Invention

The present invention relates to a working system for an aeroplane, and more particularly to a working system comprising a hangar for accommodating an aeroplane, a partition wall for partitioning the hangar into a fuselage work area around a fuselage and a main wing work area around a main wing, and working tables arranged in the fuselage work area, wherein the partition wall is movable between a predetermined partitioning position and a retracted position allowing entrance and exit of the aeroplane.

2. Description of the Related Art

Figure 12:
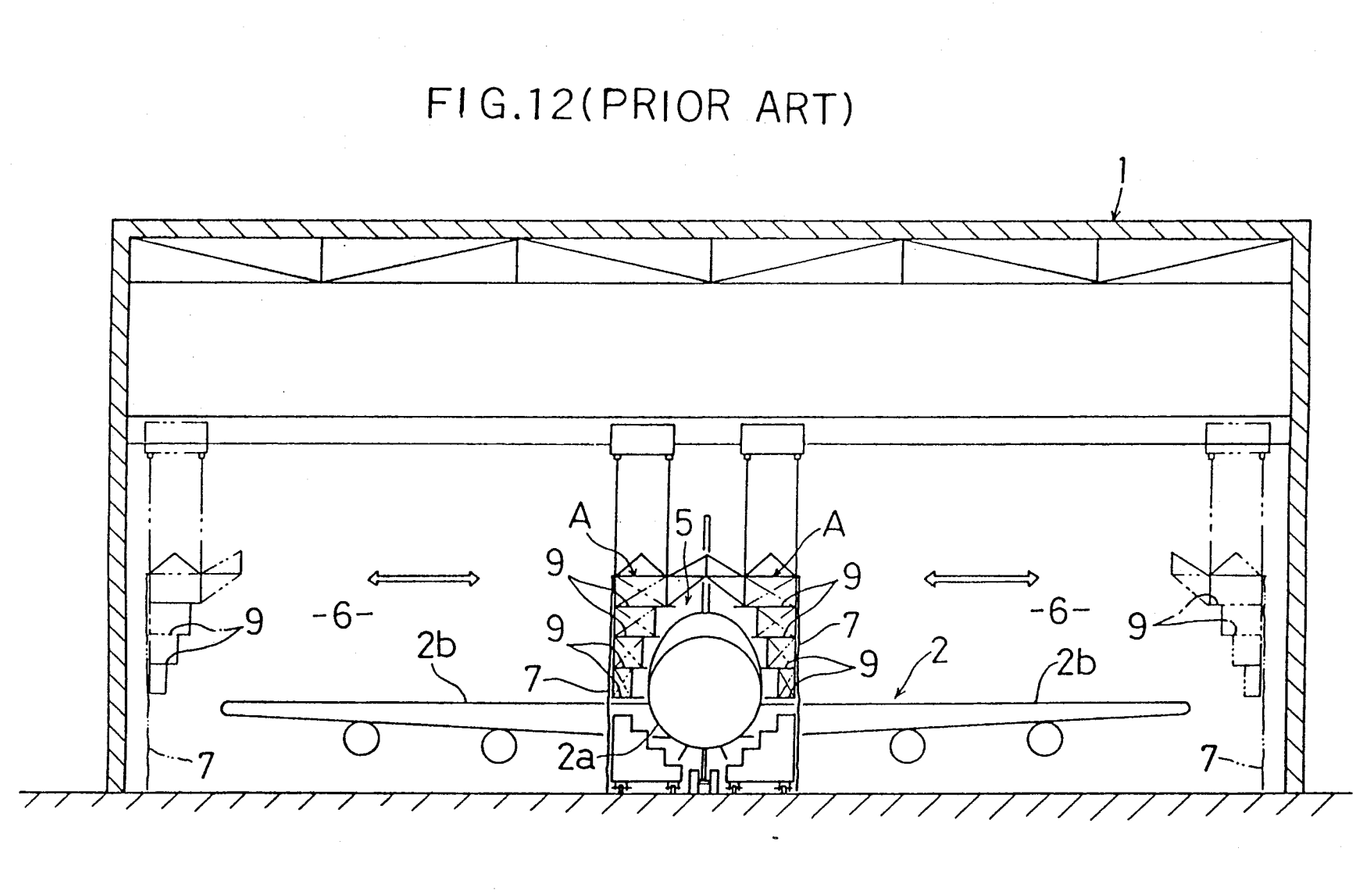
FIGS. 12 and 13 are a front sectional view and a plane sectional view showing a conventional system.
Figure 13:
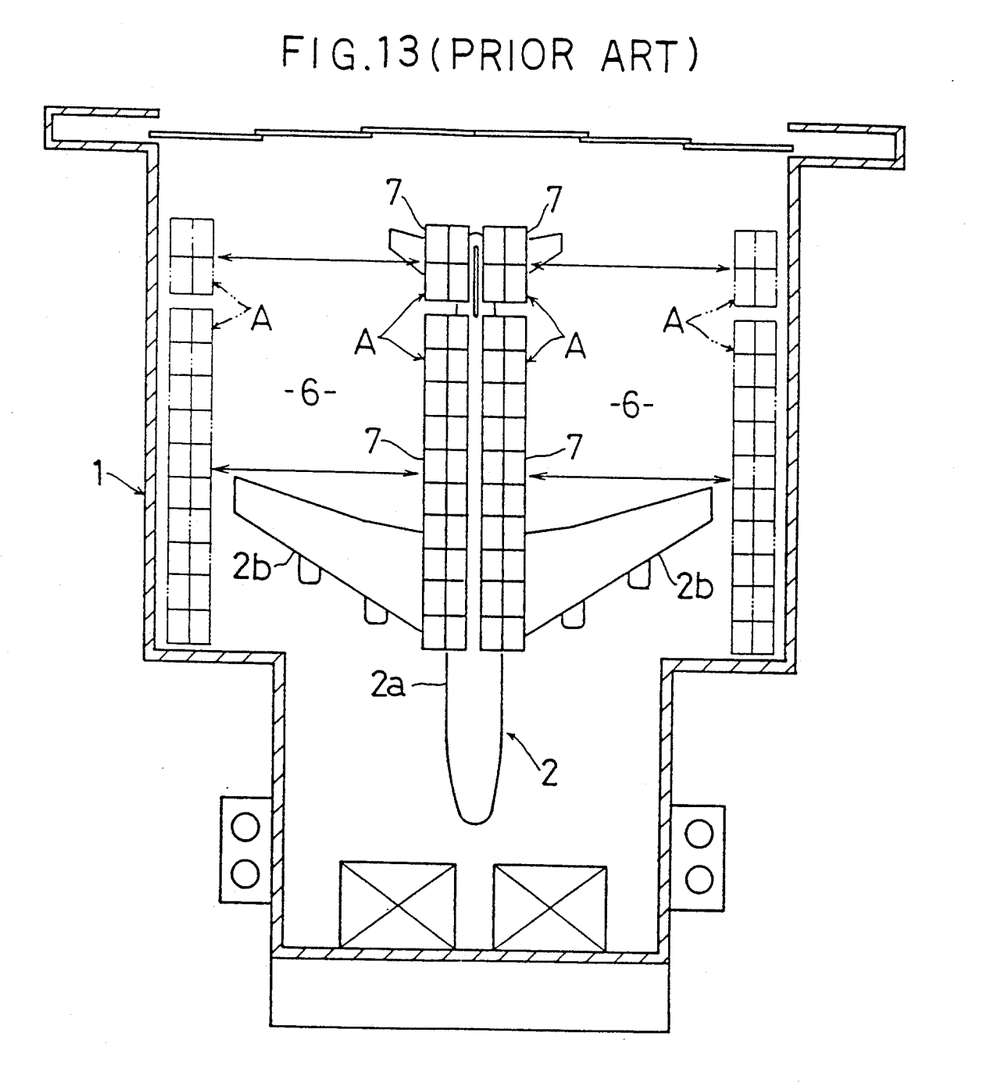

As shown in FIGS. 12 and 13, the conventional working system for the aeroplane as noted above includes frame constructions A provided in opposite sides of the fuselage $2a$ and having the working tables 9 vertically and serially arranged substantially through the length of the fuselage $2a$ of the aeroplane 2. A curtain member 7 extends outside of each frame construction A to act as the partition wall for partitioning between the fuselage work area 5 around the fuselage $2a$ and the main wing work area 6 around the main wing $2b$. The vertically arranged working tables 9 serve for various workings on the fuselage $2a$ of the fuselage work area 5.

The frame constructions A per se are moved to an outwardly retracted position away from a position adjacent the fuselage $2a$ by a great distance thereby to allow the partition wall 7 having the curtain member to be movable between the partitioning position adjacent the fuselage $2a$ and the retracted position allowing entrance and exit of the aeroplane 2.

However, in such a conventional structure, the huge frame construction A having the working tables vertically and serially arranged substantially through the length of the fuselage $2a$ has to be moved thereby to move the partition wall 7 between the partitioning position and the retracted position, which requires a grandscaled moving system and results in high manufacturing and maintenance cost.

In addition, the workers have to move between the working tables 9 vertically and serially arranged substantially through the length of the fuselage $2a$ to be engaged in various workings, which deteriorates an operational efficiency.

In general, the working system of this type employs a ventilation system for the fuselage work area 5. However, the working tables 9 vertically and serially arranged substantially through the length of the fuselage $2a$ interrupt a ventilating air flow to cause ill ventilation around every portion of the working tables 9, as a result of which an improvement in a working environment through ventilation has not been fully achieved.

A primary object of the present invention is to provide an improved working system for overcoming the above-noted disadvantages.

SUMMARY OF THE INVENTION

In order to achieve the above object, the present invention is characterized by a working system for an aeroplane comprising a hangar accommodating the aeroplane, a partition wall partitioning the hangar into a fuselage work area around a fuselage and a main wing work area around a main wing and movable between a predetermined partitioning position and a retracted position allowing entrance and exit of the aeroplane, and working tables arranged in the fuselage work area and movable within the fuselage work area separately from the partition wall.

This construction has the following functions and effects.

Since the working tables and the partition wall in the fuselage work area are separated, that is, the partition wall is movable between the partitioning position and the retracted position separately from the working tables, the moving system for the partition wall between the partitioning position and the retracted position can be simplified to a great extent, compared with the conventional system having the working tables vertically and serially arranged substantially through the length of the fuselage and the grandscaled frame constructions provided with the curtain members extending the outside thereof to move the partition wall between the partitioning position and the retracted position.

The moving system for the working tables allows the workers to work against any portions of the fuselage, which can reduce the working tables in dimension per se compared with the conventional ones arranged vertically and serially substantially through the length of the fuselage, and thus results in a simple moving structure for the working tables.

Therefore, the whole moving system can be simplified even taking the moving structures for the partition wall and the working tables into consideration, compared with the conventional moving system for the grandscaled frame constructions having the working tables vertically and serially arranged substantially through the length of the fuselage and the curtain members extending the outside thereof.

In addition, the workers can be engaged in workings in every portion of the fuselage through movement of the working tables movable within the fuselage work area, which can effectively enhance the operational efficiency, compared with the conventional system in which the workers have to move between the working tables vertically and serially arranged substantially through the length of the fuselage.

The working tables reduced in dimension can solve the problem that the conventional working tables vertically and serially arranged substantially through the length of the fuselage interrupt the ventilating air flow to cause the ill ventilation around every working area on the working tables, and can effectively improve the working environment.

According to the functions as noted above, the present invention can effectively improve the operational efficiency and the working environment through air ventilation, and can drastically reduce the cost for the whole system by simplification of the moving structures. Consequently, the working system for the aeroplane which is superior in both of functional and economical aspects can be provided.

It is more preferable to allow the working tables in the working system for the aeroplane to be movable in a longitudinal direction, a transverse direction and a vertical direction of the fuselage.

With such a structure, the workers can be readily and efficiently engaged in various workings around any portions of the fuselage of the aeroplane free from a great deal of moving labor in combination with the longitudinal direction, transverse direction and vertical direction of the working tables with respect to the fuselage.

It is further preferred to provide an automatic working machine and a working space disposed in opposite sides on each working table in which the working table is selectively positioned through pivotal movements about a vertical axis between a position where the side adjacent the automatic working machine is oriented toward the fuselage and a position where the other side adjacent the working space is oriented toward the fuselage.

In such a structure, the caretaker in the working space can monitor the automatic working when effecting the automatic working without disturbing the operations of the automatic working machine by turning the working tables to the position where the side adjacent the automatic working machine is oriented toward the fuselage. Further, the workers can efficiently effect various manual operations against the fuselage without interfering with the automatic working machine by turning the working table to the position where the other side adjacent the working space is oriented toward the fuselage.

Further and other objects, features and effects of the invention will become more apparent from the following more detailed description of the embodiments of the invention with reference to the accompanying drawings.

BRIEF DESCRIPTION OF THE DRAWINGS

Accompanying drawings FIGS. 1 through 11 illustrate a working system for an aeroplane embodying the present invention; in which.

DESCRIPTION OF THE PREFERRED EMBODIMENTS

Preferred embodiments of an air conditioning system for an aeroplane hangar relating to the present invention will now be described in details with reference to the accompanying drawings.

Figure 1:
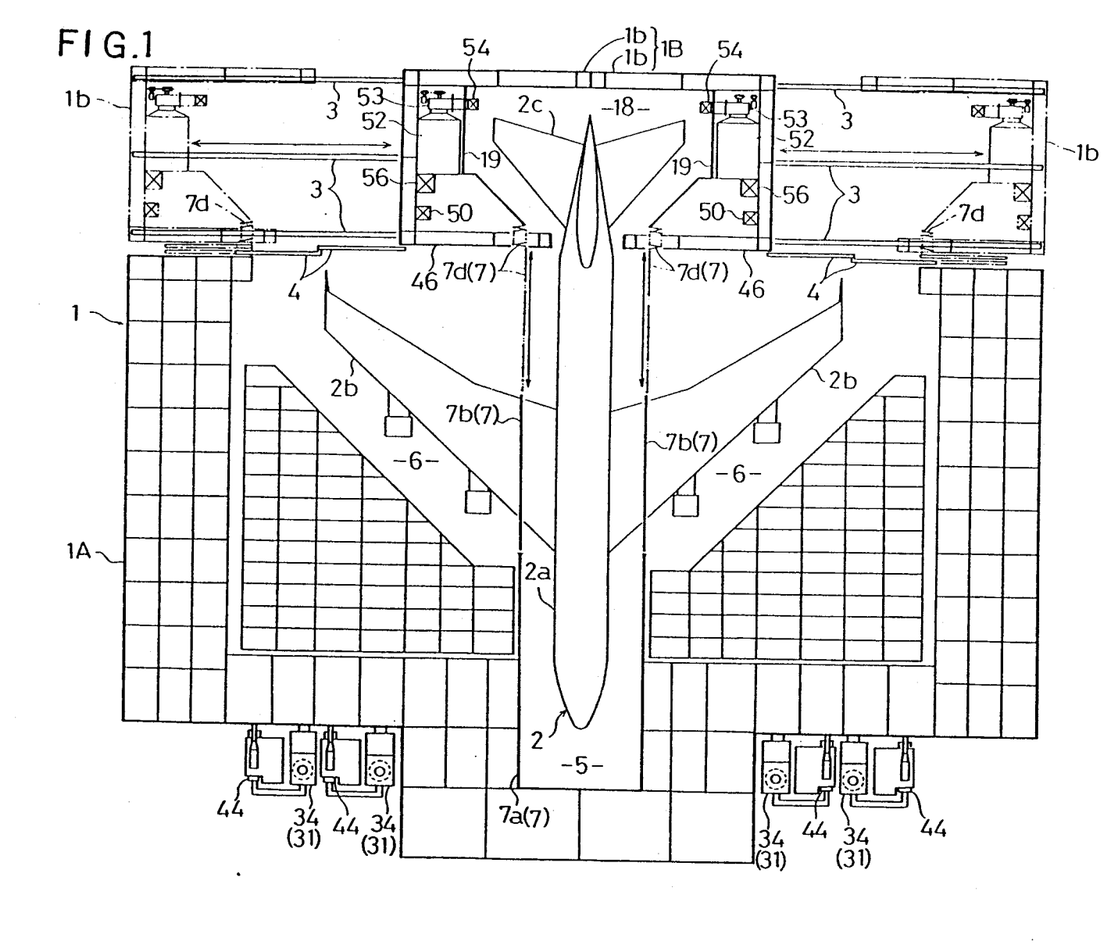
FIG. 1 is a plane view showing a structure of an aeroplane hangar.
Figure 2:
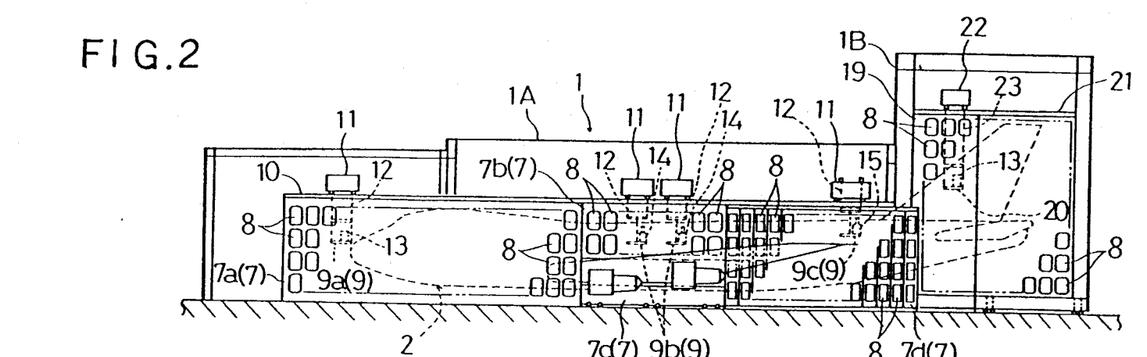
FIG. 2 is a vertical section thereof.
Figure 3:
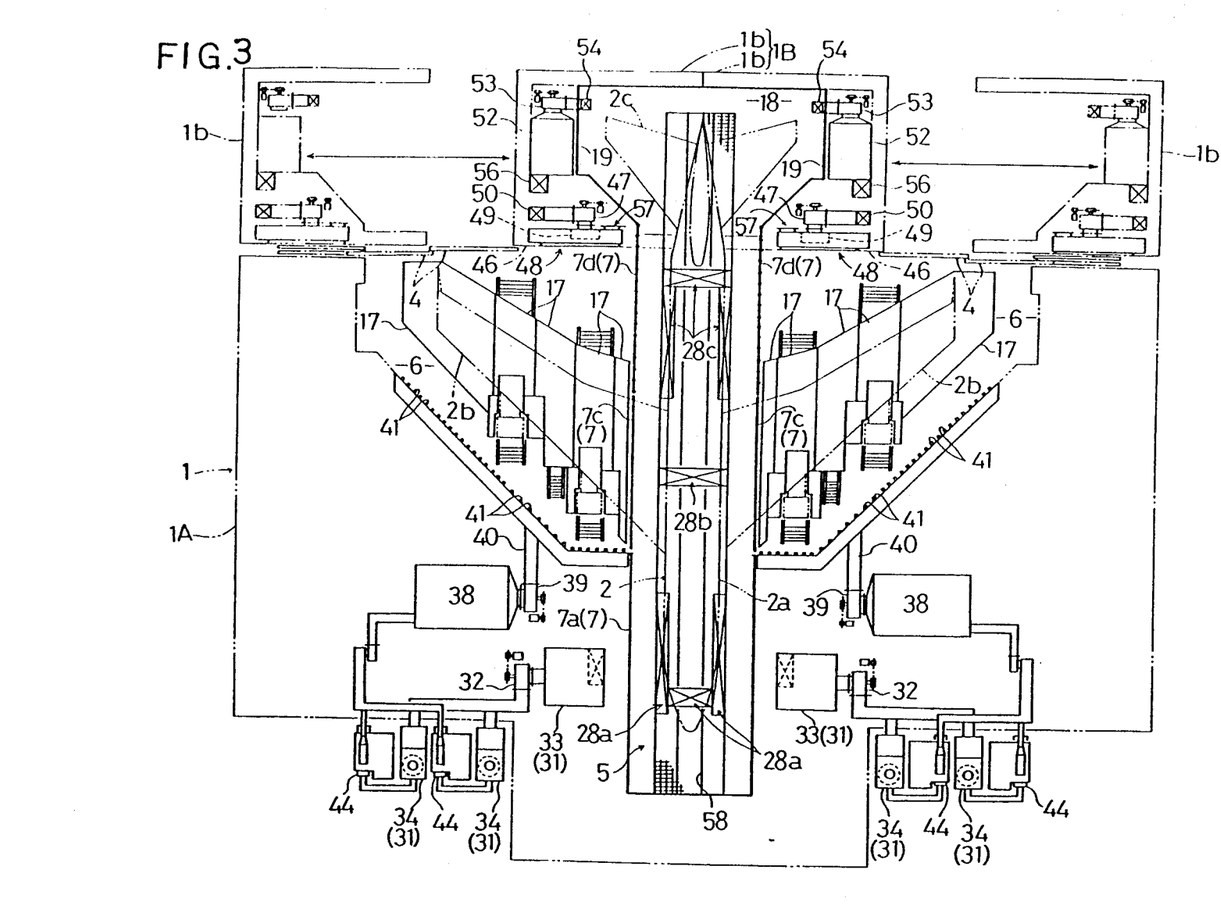
FIGS. 3 and 4 are plane views showing an interior construction of the hangar, respectively.
Figure 4:
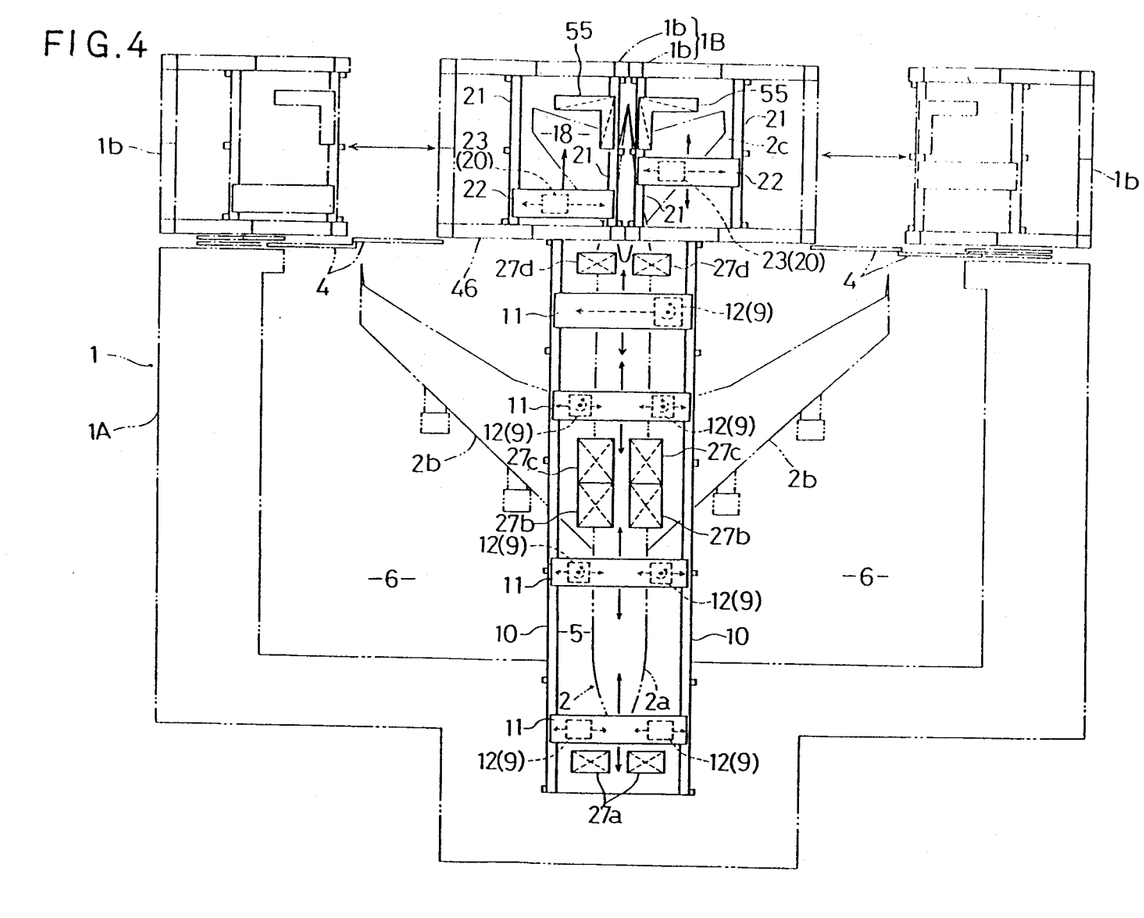
Figure 5:
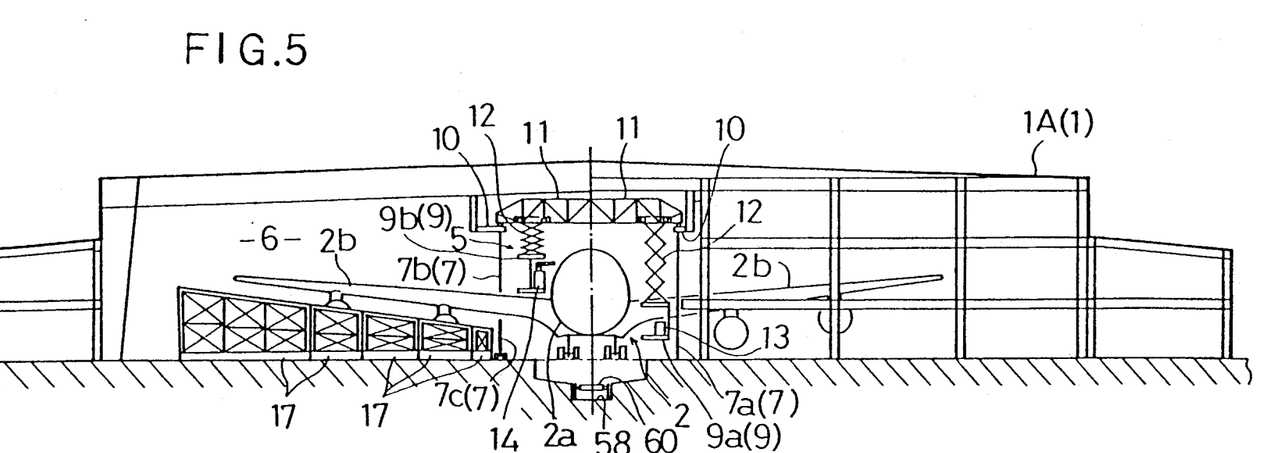
FIGS. 5 through 7 are sections, taken at longitudinal positions of a fuselage work area and of an empennage work area, respectively.
Figure 6:
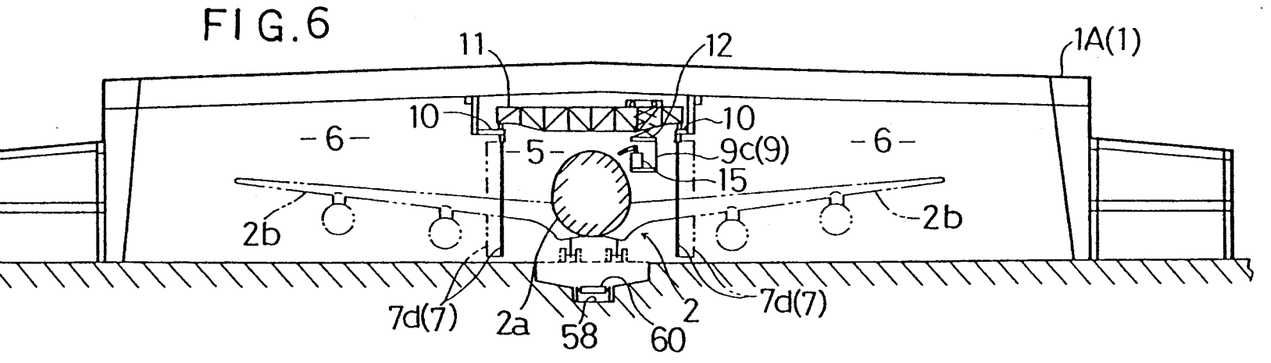
Figure 7:
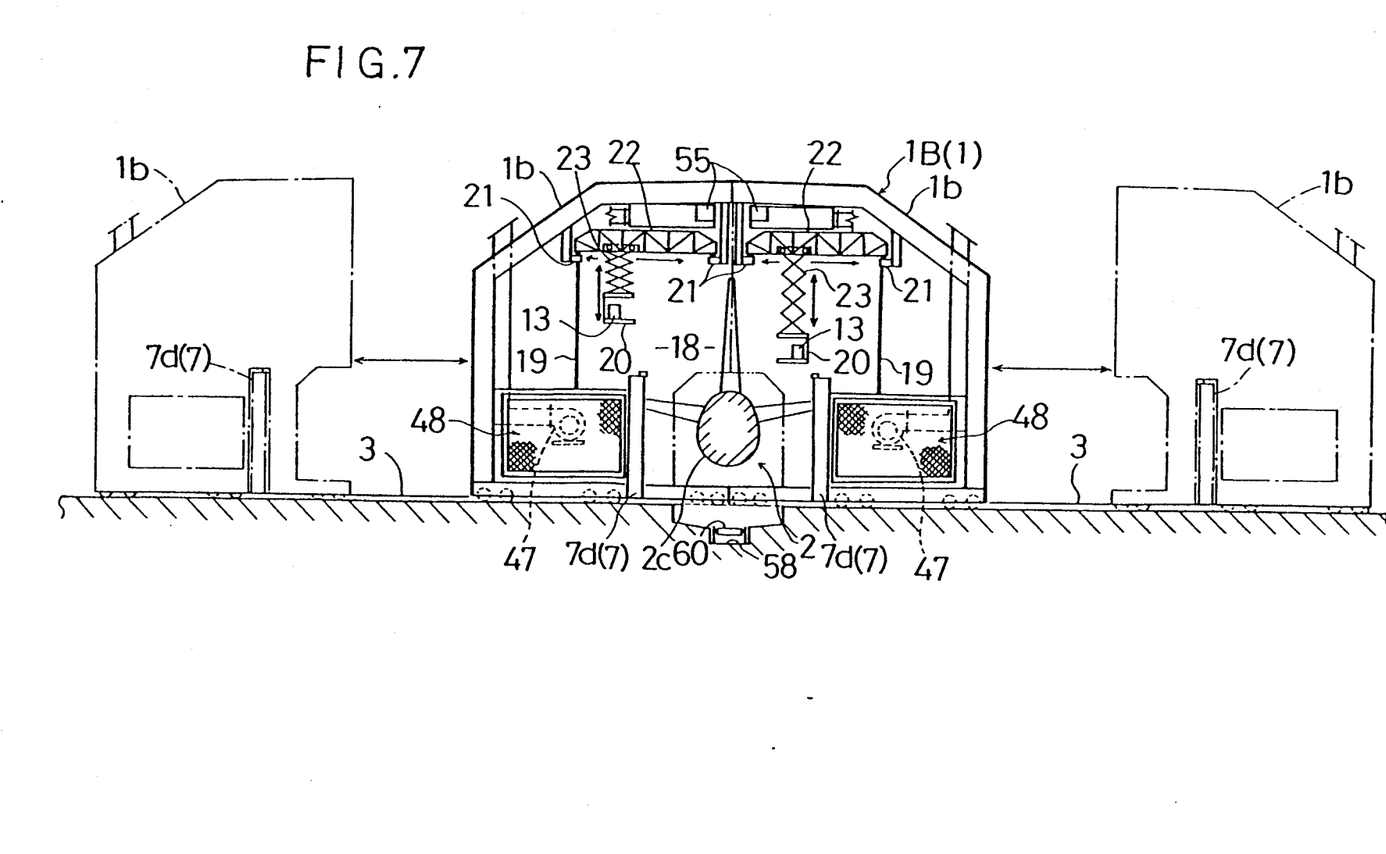

Referring to FIG. 1, a reference numeral 1 denotes a hangar for accommodating an aeroplane 2 to effect works such as re-painting job on this aeroplane 2. This hangar 1 is so designed as to introduce the aeroplane 2 from its nose.

More particularly, the hangar 1 includes a main area 1A for receiving a fuselage 2a and a main wing 2b of the aeroplane 2 and an empennage area 1B disposed adjacent an entrance to the main area 1A so as to receive an empennage 2c of the aeroplane 2. The empennage area 1B has a greater height than the main area 1A so as to accommodate the vertically extending empennage 2c.

Further, the empennage area 1B has a shorter width than the main area 1A and is divided widthwise into two sections 1b, 1b for allowing introduction of the fuselage 2a and the main wing 2b into the main area 1A. These sections 1b, 1b are movable combined into the one area 1B between an accommodating position (denoted with a solid line) where the sections 1b, 1b become united for accommodating the empennage 2c and a retracted position (denoted with an detached line) where the sections 1b, 1b are separated from each other for allowing therethrough the introduction of the fuselage 2a and the main wing 2b into the main area 1A.

A reference numeral 3 denotes a guide mechanism for guiding the above-described movements of the sections 1b. Further, a reference numeral 4 denotes an auxiliary gate for allowing entrance and exit of the main wing 2b into and out of the main area 1A.

With the above-described construction of the main area 1A and the empennage area 1B, compared with the conventional construction where the entire hangar 1 has the long width corresponding to the main wing 2b and the long height corresponding to the empennage, it becomes possible to reduce the construction costs of the entire hangar 1 and also to reduce the installation and running costs of the ventilation and air conditioning system inside the hangar 1.

In the main area 1A of the hangar 1, there is provided a partition wall 7 for sectioning this area 1A into a fuselage work area 5 for works on the fuselage 2a accommodated therein (including also the nose of the aeroplane, in this particular embodiment) and a main-wing work area 6 for works on the main wing 2b. As this partition wall 7 sections the area 1A into the fuselage work area 5 and the main-wing work area 6, it is possible to simultaneously effect different works at the respective areas 5, 6 without the work at one area disadvantageously affecting that at the other area.

The partition wall 7 is movable between a partitioning position (the position shown in the drawings) where the wall 7 is positioned across the fuselage 2a through the entire length thereof and a retracted position where the wall 7 is retracted for allowing unobstructed entrance and exit of the aeroplane 2. More particularly, the partition wall 7 includes a top wall portion 7a positioned across the fuselage 2a forwardly of the main wing 2b and a central upper wall portion 7b positioned across the fuselage 2a upwardly of the main wing 2b. These wall portions 7a and 7b are fixedly installed since the portions 7a, 7b do not interfere with the movement of the aeroplane 2 when the partition wall 7 is placed at the partitioning position. The partition wall 7 further includes a central lower portion 7c positioned across the fuselage 2a downwardly of the main wing 2b and a rear wall portion 7d positioned across the fuselage 2a rearwardly of the main wing 2b. These wall portions 7c and 7d are constructed as movable since the portions 7c, 7d interfere with the movements of the aeroplane 2 when the partition wall 7 is placed at the partitioning position.

Specifically, the central lower wall portion 7c has right and left sides thereof independently movable by means of e.g. casters each between the partitioning position and the retracted position. The rear wall portion 7d has a foldable construction guided on upper and lower rail type guide mechanisms. That is, at the partitioning position, right and left sides of this rear wall portion 7d are folded out to partition the rear sides of the fuselage 2a. On the other hand, at the retracted position, the right and left sides of the rear wall portion 7d are folded in to a predetermined storing position adjacent the empennage work area 1B. The right and left sides of this rear wall portion 7d are independently movable. Also, the retracting movement of this rear wall portion 7d, at its retracted, i.e. folded storing, position, is associated with the movement of the respective sections 1b to their retracted positions in the empennage area 1B.

Incidentally, at the respective portions of the partition wall 7, there are provided a plurality of transparent glass windows 8 for allowing entrance of light into the hangar 1 and allowing also monitoring of the works at the fuselage work area 5 from the outside.

In the fuselage work area 5, separately of the partition wall 7 at its partitioning position, there are provided working tables 9 movable inside this fuselage work area 5, so that various works on the fuselage 2a can be effected efficiently by the free movements of the working tables 9.

Referring more particularly to the movable construction of the working tables 9, at a ceiling portion of the hangar 1 and at positions corresponding to side edges of the fuselage work area 5, there are provided a pair of rails 10 extending along the entire length of the fuselage work area 5 and a plurality of transverse frames 11 disposed between the rails 10 and movable on these rails 10 along the longitudinal direction of the fuselage 2a. Further, from each transverse frame 11, a pair of vertically expandable frames 12 are continuously extended for the right and left sides of the fuselage 2a, and the working tables 9 are attached respectively to lower ends of these vertically expandable frames 12.

In operation, each working table 9 is moved longitudinally of the fuselage 2a as being guided on the rails 10 of the transverse frame 11. Also, the table 9 is moved vertically of the fuselage 2a as being guided by expanding and contracting motions of each vertically expandable frame 12. Further, the table 9 is moved across the width of the fuselage 2a through the movements of the expandable frame 12 relative to the transverse frame 11.

As described above, since a plurality of the transverse frames 11 are provided and also a plurality of the working tables 9 are dispersed along the length of the fuselage 2a, various works on the fuselage 2a can be effected independently at the further sectioned work zones sectioned in the fuselage work area 5 along the length of the fuselage 2a.

Of the working tables 9 installed in the fuselage work area 5, a pair of working tables 9a positioned beside the nose of the aeroplane 2 mount painting machines 13 with which maintenance workers effect manual painting operations on the fuselage 2a. Further, each of the above working tables 9a includes a working space for allowing the maintenance worker to effect the manual work. On the other hand, two working tables 9b, which are placed at longitudinally intermediate positions relative to the fuselage 2a, each mounts a one-hand robot type automatic painting machine 14 for effecting automatic painting operation on the side peripheral faces of the fuselage 2a and also a working space for the worker to effect other works.

Further, a working table 9c placed adjacent a side of the empennage mounts also a one-hand robot type automatic painting machine 15 for effecting automatic painting operation on an upper peripheral face of the fuselage 2a and also a working space for the worker to effect other works.

Figure 8:
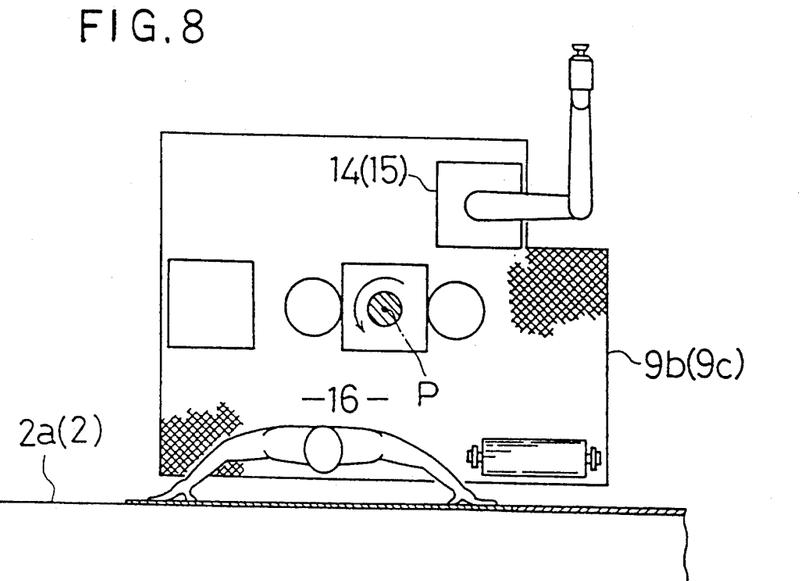
FIGS. 8 and 9 are plane views illustrating uses of working tables inside the hangar.
Figure 9:
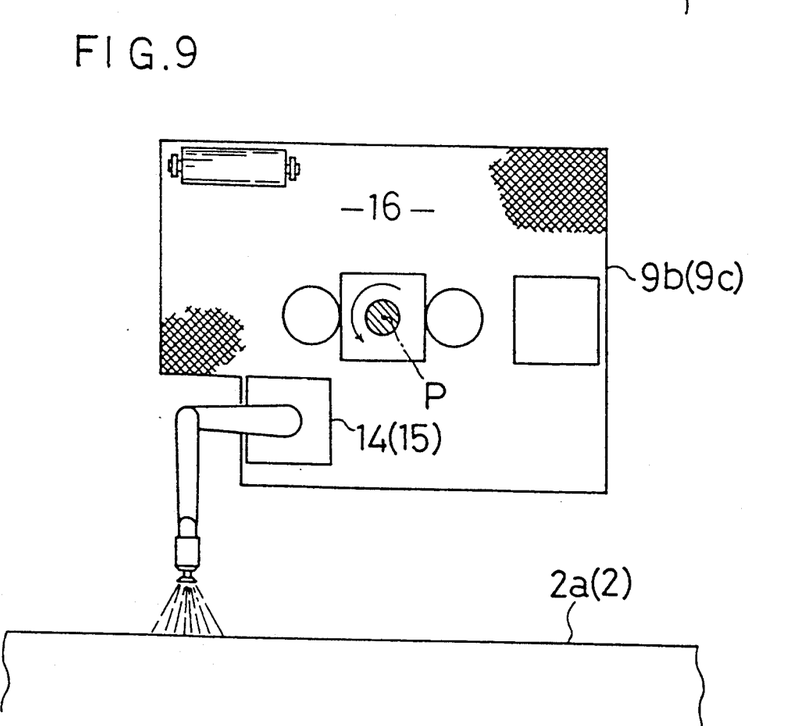

Referring more particularly to the working tables 9b, 9c mounting the automatic, side painting machine 14 and the automatic, top painting machine 15, as illustrated in FIGS. 8 and 9, the machines 14, 15 and the working spaces 16, 16 are disposed side by side on the working tables 9b, 9c, respectively. Further, these working tables 9b, 9c are so attached to the vertically expandable frames 12, 12 that the tables 9b, 9c are selectively positioned through pivotal movement of the tables 9b, 9c about a central vertical axis P between an automatic painting position (shown in FIG. 9) where the side adjacent the automatic painting machine 14 (15) is oriented toward the fuselage 2a and a manual working position (shown in FIG. 8) where the other side adjacent the working space is oriented toward the fuselage 2a. Accordingly, during an automatic painting operation, the supervising worker standing at the working space 16 will not interfere with the automatic painting operation of the automatic painting machine 14 (15). Similarly, during a manual work, the worker can efficiently effect the work without being interfered with by the presence of the automatic painting machines 14, 15.

In the main-wing work area 6, there are provided a floor-moving type working tables 17 movable on the floor of this work area 6. These working tables 17 mount various kinds of work devices, so that various works such as maintenance of an aeroplane engine and painting works can be effected on these working tables 17.

Further, each of these working tables 17 installed in the main-wing work area 6 has a lift mechanism for allowing adjustment of height of the table 17 depending on the work to be effected thereon.

In the empennage area 1B, there are installed inner walls 19 for surrounding the empennage work area 18 adjacent the empennage 2c accommodated therein. Further, there are provided working tables 20, which are movable in this empennage area 1B, on the opposed sides of the empennage. These working tables 20 include various painting devices 13 for effecting manual painting operations on the empennage 2c and working spaces for the workers to effect other works on the empennage 2c.

The moving construction of the working tables 20 in the empennage area 18 is substantially the same as that employed for moving the working tables 9 of the fuselage area 5. That is, vertically expandable frames 23 are extended from a pair of right and left transverse frames 22 movable along the longitudinal direction of the fuselage 2a, so that the expandable frames 23 can freely move along the width of the fuselage 2a. And, the working tables 20 are attached respectively to lower ends of these vertically expandable frames 23.

The right and left inner walls 19 for surrounding the empennage area 18 and the right and left working table moving mechanisms 20, 21, 22, 23 extending from the rails 21 to the working tables 20 are provided separately in the right and left sections 1b. Then, for allowing movement of the fuselage 2a and the main wing 2b in and out of the main area 1A, these right and left inner walls 19 and the working table moving mechanisms 20, 21, 22 and 23 are moved together with the respective sections 1b.

Figure 10:
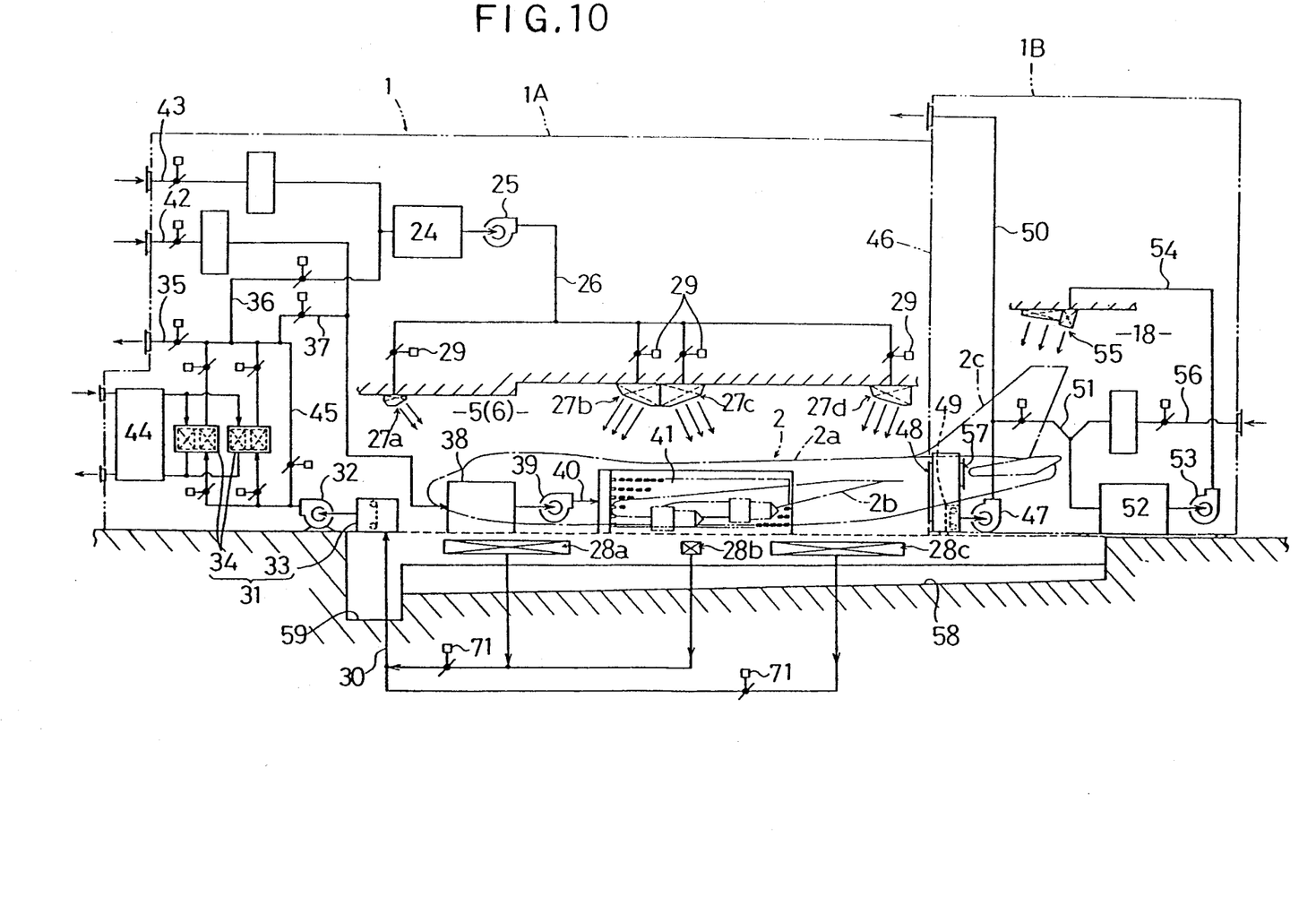
FIG. 10 is a system view of an air ventilation system.

Next, a ventilation and air conditioning system for the fuselage work area 5 will be described with reference to FIG. 10. As shown, a main air conditioning device 24 is provided for cleaning and conditioning the temperature of air to be fed to the fuselage work area 5. At the ceiling portion corresponding to the fuselage work area 5, there are arranged, along the length of the fuselage 2a, a plurality of fuselage air vent openings 27a, 27b, 27c and 27d for receiving the air from the main air conditioning devices 24 to feed it into the fuselage work area 5 through air feed fans 25 and air feed passages 26. On the other hand, at the floor portion corresponding to the fuselage work area 5, there are provided floor air inlet openings 28a, 28b and 28c at positions extending along the peripheral edge of the fuselage work area 5 and adjacent opposed ends of the fuselage 2a and at a position corresponding to the longitudinal center of the fuselage 2a, respectively.

In operation, the dust-eliminated and temperature-conditioned air is fed through the fuselage air vent openings 27a, 27b, 27c and 27d disposed at the ceiling zone and by the air sucking function of the openings 28a, 28b and 28c, the air is forcibly exhausted into these air inlet openings 28a, 28b and 28c disposed at the floor zone together with harmful substance (e.g. spray mist, solvent gas and dust) generated inside this fuselage work area 5. In short, according to this air conditioning system, there is forcibly generated the downward air flow inside the fuselage work area 5, which is partitioned from the main-wing work area 6 by means of the partition wall 7 so as to avoid disadvantageous inflow of the harmful substance into the latter area 6. Consequently, the system can effectively achieve improvement of the working environment inside the fuselage work area 5.

Further, the working tables 9 disposed in this fuselage work area 5 are movable in contrast with the conventional system where the tables have a vertically multi-stage construction extending through the entire length of the fuselage 2a. This movable construction is advantageous for preventing the above-described forcible air flow from being interfered with by the presence of these working tables 9, whereby the system can further improve the working environment of the fuselage work area 5 in this respect.

The air vent openings 27a, 27b, 27c and 27d and the air inlet openings 28a, 28b and 28c are switchable, by remote control operations on a dumper 29 incorporated in the air feed passage 26 and a further dumper 71 incorporated in the air exhaust passage 30, between a condition where the vent openings 27a, 27b and the inlet openings 28a and 28b positioned forwardly in the longitudinal direction of the fuselage 2a are used for the air venting and air sucking actions respectively and a further condition where the other vent openings 27c and 27d and the other inlet opening 28c are used for these actions respectively. With this arrangement, the system can further effectively improve the working environment of the fuselage work area 5 by utilizing the forcible, i.e. push-pull air flow while minimizing the area of necessary air conditioning, so that the system can save consumption of the energy needed for the air conditioning operation. This, in turn, means that the system can be formed compact and of a smaller capacity for achieving the same air conditioning effect.

For conditioning the air of the main-wing work area 6, there is provided an air recycling device 31 for cleaning the exhaust air from the fuselage work area 5 and then feeding this cleaned air to the main-wing work area 6. More particularly, the air recycling device 31 consists essentially of a dust eliminating device 33 for eliminating dust from the exhaust air introduced from the fuselage work area 5 through the air vent openings 28a, 28b and 28c by means of an air exhaust fan 32 and of a rotary adsorbing/desorbing type air disposing device 34 for separating and eliminating permeable harmful substance such as solvent gas still contained at the air from the dust eliminating device 33.

For utilizing the air cleaned by the recycling device 31 as the air to be fed to the main-wing work area 6, the cleaned air is divided into three air flows. That is, one of these air flows is exhausted, as cleaned exhaust air, out of the hangar 1 through the air exhaust passage 35. Another air flow is recycled to the main air conditioning device 24 described hereinbefore. And, the other air flow is guided to a main-wing area air conditioning device 38 through a relay passage 37, so that this air conditioning device 38 again eliminates remaining dust from and conditions the temperature of this air flow portion to feed it as ventilation air to main-wing area air vent openings 41 through an air feed passage 40 by means of a further air feed fan 39.

The main-wing air conditioning device 38 receives, in addition to the cleaned air from the recycling device 31, fresh ambience air introduced through an ambience air inlet passage 42, with these airs being combined together and the device 38 effects the dust eliminating operation and the temperature condition's operation on this combined air flow to feed it to the main wing work area 6. As described above, the exhaust air from the fuselage work area 5 is cleaned by the recycling device 31 and this cleaned air is utilized as a part of the air to be fed to the main wing work area 6. Accordingly, the system can effectively utilize the heat (cold heat in case the main air conditioning device 24 cools the air, or hot heat in case the conditioning device 24 warms the air) retained in the exhaust air from the fuselage work area 5, thus saving consumption of the energy needed for conditioning the temperature of the air to the main wing work area 6 by an amount corresponding to the amount of heat retained in the exhaust air. Consequently, the system can employ a compact and small capacity conditioning device as the main wing area air conditioning device 38.

Moreover, the main air conditioning device 24 receives, in addition to the cleaned air flow portion from the recycling device 31, fresh ambience air introduced through an ambience air inlet passage 43, with the airs being combined together, so that the main air conditioning device 24 effects dust eliminating operation and the temperature conditioning operation on this combined air flow. That is, the main conditioning device 24 can effectively utilize the exhaust air fed after cleaning from the recycling device 31 as a portion of the air to be fed to the fuselage work area 5. As a result, compared with the conventional system which conditions the entire amount of ambience air for feeding it to the fuselage work area 5, the system of the present invention can effectively utilize the heat retained in the exhaust air from the main wing work area 6, thus saving consumption of the energy needed for conditioning the temperature of the air to the fuselage work area 5 by an amount corresponding to the amount of heat retained in the exhaust air. Consequently, the system can employ a compact and small capacity conditioning device as the main wing area air conditioning device 38.

The main-wing area air vent openings 41 for feeding to the main wing work area 6 the air dust-eliminated and temperature-conditioned through the main wing area air conditioning device 38 are so arranged as to vent the air with rearward or obliquely rearward orientation towards the main wing 2b from the front portion of the main wing 2b and through the entire width of the main wing 2b. Accordingly, these air vent openings 41 can feed the air only to the vicinity around the main wing in a concentrated manner. As a result, in this main wing work area 6 too which is larger than the fuselage work area 5, the system can effectively improve the working environment for the workers engaged in various works on the main wing 2b with very small amount of air flow.

A reference numeral 44 in the drawings denotes a catalytic combustion device for incinerating the desorbed harmful substance such as the solvent gas which has been separated from the exhaust air through the rotary adsorbing/desorbing type air treating device 34 and been combined with a high-temperature air for desorption.

A reference numeral 45 denotes a bypass passage for the rotary adsorbing/desorbing type air treating device 34. A portion of the dust-eliminated air from the dust eliminating device 33 passes through this bypass passage 45.

A further partitioning wall 46 is provided for partitioning between the main area 1A and the empennage area 1B; and this partitioning wall 46 defines a main-wing area air inlet opening 48 for forcibly introducing the air of the main wing work area 6 by means of an air exhaust fan 47. In operation, the rearward air outlet from the main-wing air vent openings 41 and the air inlet through the above-described main-wing area air inlet opening 48 are combined to smoothly flow the ventilation air around the main wing 2b. With this, the system can effectively improve the working environment for those workers engaged in the works on the main wing 2b.

For conditioning the air to the empennage work area 18, there is provided a further air recycling device 49 for cleaning the exhaust air from the main wing work area 6 and then feeding it to the empennage work area 18. More specifically, as this recycling device 49, there is provided in the empennage area 1B a dry filter device 49 for cleaning by filtering the exhaust air from the main-wing work area 6 introduced through the main-wing area air inlet opening 48.

A portion of the cleaned air cleaned by this dry filter device 49 is exhausted out of the hangar through an empennage area air exhaust passage 50. The remaining portion of the cleaned air is guided through a relay passage 51 to an empennage area air conditioning device 52, which again eliminates dust from and conditions the temperature of the air to feed it through an air feed fan 53 and an air feed passage 54 to an empennage area air vent opening 55.

The empennage area air conditioning device 52 receives, in addition to the portion of the cleaned air from the dry filter device 49, fresh ambience air introduced through an ambience air inlet passage 56 and then effects the dust eliminating operation and the temperature conditioning operation on these air combined. Thereafter, the device 52 feeds the conditioned air to the empennage work area 18. Accordingly, since the system cleans the exhaust air from the main-wing work area 6 and utilizes the heat retained in this exhaust air, the system can save consumption of energy needed for conditioning the temperature of the air to be fed to the empennage work area 18. Consequently, this empennage work area air conditioning device 52 may be of a compact, small-capacity type.

While the empennage area air vent opening 18 is disposed at an upper position in the empennage work area 18, the empennage area air inlet opening 57 for introducing the air in the empennage work area 18 is disposed at a lower position of the area 18 so as to be able to effectively achieve the improvement of the working environment. Further, the exhaust air which has been introduced from the empennage work area 18 through this air inlet opening 57 is cleaned by the above-described dry filter device 49 together with the exhaust air introduced from the main-wing work area 6 through the main-wing air inlet opening 48.

That is to say, after the exhaust air from the empennage work area 18 is cleaned by the dry filter device 49, a portion of this cleaned air is exhausted out of the system through the empennage area air exhaust passage 50 while the remaining portion of the cleaned air is recycled to the empennage area air conditioning device 52. With this, through the effective utilization of the heat remaining in the exhaust air from the empennage work area 18, the system can further save consumption of the energy needed for conditioning the air to be fed to the empennage work area 18.

In summary, the system of the present invention can save energy consumption in its air conditioning operation at each of the work areas 5, 6 and 18 through effective utilization of the heat remaining in the exhaust air. Accordingly, each of the air conditioning devices 24, 38 and 52 can be of a compact and small-capacity type. Consequently, the system can achieve significant conservation of energy in the entire hangar 1 as well as significant reduction in the entire system installation costs.

Like the inner wall 19 and the working table moving mechanisms 20, 21, 22 and 23 described hereinbefore, the right and left partition walls 46 each defining the main-wing area air inlet opening 48, the right and left dry filter devices 49 and the right and left empennage area air conditioning devices 52 are provided independently at the right and left sections 1b constituting the empennage area 1B. Accordingly, for moving the fuselage 2a and the main wing 2b into and out of the main area 1A, these right and left pairs of the partition walls 46, the dry filter devices 49 and the empennage area air conditioning devices 52 are moved independently together with each section 1b.

Figure 11:
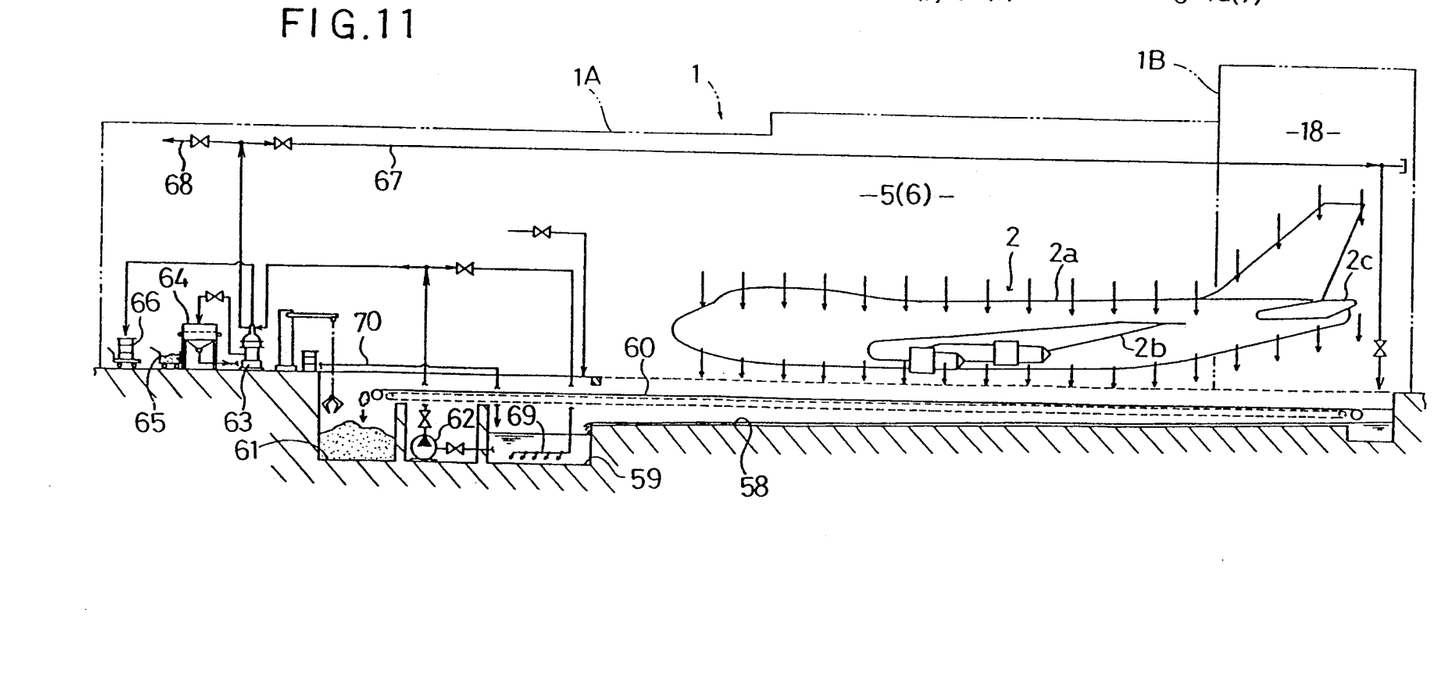
FIG. 11 is a system view of a drainage system.

At the floor zones of the fuselage work area 5 and of the empennage work area 18, as shown in FIG. 11, there is provided one continuous paint-collecting groove 58 extending from the front end of the fuselage work area 5 to the rear end of the empennage work area 18. More particularly, before a re-painting operation is effected on the fuselage 2a and the empennage 2c, the old paint on these aeroplane portions has to be peeled off by using a paint-peeling liquid and then the peeled paint sludge must be flushed away in cleaning water. For this purpose, the flush cleaning water is caused to flow at the paint-collecting groove 58 and collected at a water tank 59 disposed at a downstream end of the groove 58.

The above-described paint-collecting groove 58 incorporates a sludge-collecting filter conveyer 60 extending through the entire length of the groove 58, so that this filter conveyer 60 cleans the water running at the groove 58 by filtering the sludge entrapped in the water.

The paint sludge collected by the filter conveyer 60 is conveyed on this conveyer and collected at a sludge tank 61. Thereafter, the collected sludge is appropriately disposed of by a sludge disposing system provided separately from the air conditioning system.

On the other hand, the cleaning water collected at the water tank 59 is conveyed by a pump 62 to a centrifugal-force separator 63, so that the separator 63 separates and eliminates any remaining paint sludge and oil substance contained therein. Then, this paint sludge separated by the separator 63 is dehydrated by a sludge filtering device 64 and then conveyed to the aforementioned sludge disposing system. Whereas, the oil substance separated also by the separator 63 is collected at a collector container 66.

A portion of the cleaning water having its paint sludge and oil substance eliminated by the separator 63 is fed through a recycling passage 67 to the upstream end of the paint-collecting groove 58 to be re-used as the flush cleaning water at the groove 58.

The remaining portion of the above cleaning water is conveyed through a water exhaust passage 68 to an exhaust water disposing system to be appropriately disposed of thereby.

The water tank 59 incorporates a nozzle device 69 for recycling by discharging a portion of the cleaning water pumped out by the pump 62 back into this tank 59. This water discharging operation by the nozzle device 69 stirs the tank water thus effectively preventing precipitation and accumulation of the sludge inside the tank 59.

A reference numeral 70 in the drawings denotes a water recycling passage for recycling the cleaning water collected from the paint sludge by the sludge filtering device 64 back to the water tank 59.

Some other embodiments of the invention will be specifically described next.

(A) Apart from the foregoing embodiment employing a plurality of divided wall portions 7a, 7b, 7c and 7d, the partition wall 7 partitioning between the fuselage work area 5 and the main wing work area 6 may be modified in various ways. For instance, the partition walls 7 provided in the opposite sides of the fuselage 2 may be arranged in series in the longitudinal direction of the fuselage 2.

(b) The partition wall 7 may be formed of various types of materials, e.g. a cloth material.

(c) The moving structure of the partition wall 7 may be practiced in various ways, in place of the foldable construction guided on the rail type guide mechanism, or the construction movable by means of casters as described in the foregoing embodiment.

In order to move the partition wall 7 between the partitioning position and the retracted position, either the construction rendering only part of the partition wall 7c and 7d movable or the construction rendering the whole partition wall 7 movable may be employed.

(D) The partitioning position of the partition wall 7 and the retracted position for allowing entrance and exit of the aeroplane may be properly decided in accordance with the structure of the hangar 1.

(E) The working tables 9 in the fuselage working area 5 may be structured in various ways. For example, a working table unit having the vertically arranged working tables 9 reduced in longitudinal dimension may be provided to be movable in the longitudinal direction of the fuselage 2a, or the plurality of working tables 9 arranged in the longitudinal direction of the fuselage 2a may be provided to be movable vertically and transversely of the fuselage 2a.

(F) The movable structure for the working tables 9 may also be practiced in various ways. The working tables 9 may be suspended from the ceiling or supported to the floor by leg structures.

(G) The working tables having the same structure as the working tables 9 of the fuselage work area 5 as set forth in the foregoing embodiment may be utilized in the main wing work area 6.

(H) The working automatic machines 14 and 15 to be mounted on the working tables 9 may be the automatic painting machines as set forth in the foregoing embodiment or any other types of working machines.

What is claimed is:

1. A working system for an aeroplane comprising:
a hangar for accommodating the aeroplane;
a partition wall provided within said hangar for partitioning said hangar into a fuselage work area around a fuselage of the aeroplane and a main wing work area around a main wing;
working tables arranged in said fuselage work area, said partition wall being movable between a predetermined partitioning position and a retracted position allowing entrance and exit of the aeroplane, said working tables being movable within said fuselage work area separately from said partition wall;
an air conditioning device for conditioning temperature of air to be fed to said fuselage work area;
a main wing area air conditioning device which effects temperature conditioning operation of air to be fed to said main wing work area; and
a recycling device for cleaning air exhausted from said fuselage work area and then feeding the cleaned air to either said main wing work area or said fuselage work area;
wherein one component of the air cleaned by said recycling device is exhausted out of the system, another component is recycled to said air conditioning device and the remaining component is guided to said main wing area air conditioning device which effects dust eliminating operation and temperature conditioning operation of said component to feed it to said main wing work area.

2. A working system as claimed in claim 1, wherein said working tables are movable longitudinally, transversely and vertically of the fuselage.

3. A working system as claimed in claim 1 or 2, wherein said working tables are provided with automatic working machines and working spaces arranged in opposite sides thereon, each of said working tables being operable to be selectively positioned through pivotal movement about a vertical axis between a position where one side adjacent said automatic working machine is oriented toward the fuselage and a position where the other side adjacent the working space is oriented toward the fuselage.

4. A working system as claimed in claim 3, wherein said hangar includes a main area for accommodating the fuselage and the main wing of the aeroplane, and an empennage area associated with the main area for accommodating an empennage, said empennage area having a greater height and a smaller width than said main area and being widthwise divided into two sections.

5. A working system as defined in claim 1, wherein a portion of the cleaned air cleaned by said recycling device is recycled to said air conditioning device.

6. A working system as defined in claim 5, wherein said hangar includes a main area for receiving a fuselage and a main wing of the aeroplane and an empennage area disposed adjacent an entrance to said main area so as to receive an empennage of the aeroplane, said empennage area having a greater height and a smaller width than said main area and being widthwise divided into two sections.

7. A working system as defined in claim 6, wherein said partition wall is movable between a partitioning position where said partition wall is positioned across said fuselage through an entire length thereof and a retracted position where said partition wall is retracted for allowing unobstructed entrance and exit of the aeroplane.

8. A working system as defined in claim 1, wherein said main-wing air conditioning device receives, in addition to the cleaned air from said recycling device, fresh ambience air introduced through an ambience air inlet passage, with these airs being combined together; said main-wing air conditioning device effecting the dust eliminating operation and temperature control operation on this combined air flow to feed it to said main wing work area.

9. A working system as defined in claim 8, wherein said main-wing air conditioning device feeds the air through a main-wing area air vent opening only to the vicinity around said main wing in a concentrated manner.

10. A working system as defined in claim 9, wherein said hanger includes a main area for accommodating the fuselage and a main wing of the airplane, and an empennage area associated with said main area for accommodating an empennage, wherein a further partition wall is provided between said main area and said empennage area, said further partition wall defining a main-wing area air inlet opening for forcibly introducing the air of said main wing work area; an air intake through said air inlet opening and an air outlet through said main-wing area air vent opening cooperating to produce a rearward air flow around said main wing.

11. A working system as defined in claim 10, wherein a further air conditioning device is provided for cleaning exhaust air from said main wing work area and feeding it to said empennage work area.

12. A working system as defined in claim 11, wherein said further air conditioning device comprises a dry filter device.

13. A working system as defined in claim 12, wherein a portion of the air cleaned by said dry filter device is exhausted out of the system and the remaining portion of the air is guided to an empennage area air conditioning device which effects dust eliminating operation and temperature conditioning operation on said remaining air portion to feed it through an empennage-area air outlet opening to said empennage work area.

14. A working system as defined in claim 13, wherein said empennage area air conditioning device receives, in addition to the portion of the cleaned air from said dry filter device, fresh ambience air introduced through an ambience air inlet passage and then effects the dust eliminating operation and the temperature conditioning operation on these air combined to feed it to said empennage work area.

15. A working system for an aeroplane comprising:
a hangar for accommodating the aeroplane;
partition wall provided within said hangar for partitioning said hangar into a fuselage work area around a fuselage of the aeroplane and a main wing work area around a main wing of the aeroplane;
working tables which are movable longitudinally, transversely and vertically of the fuselage being arranged in said fuselage work area, said partition wall being movable between a predetermined partitioning position and a retracted position allowing entrance and exit of the aeroplane, said working tables being movable within the said fuselage work area separately from said partition wall;
wherein said working tables are provided with automatic working machines and working spaces arranged on opposite sides thereof, each of said working tables being operable to be selectively positioned through pivotable movement about a vertical axis between a first position where one side adjacent said automatic working machine is orientated toward the fuselage and a second position where the other side adjacent said working space is orientated toward the fuselage.

16. A working system as claimed in claim 15 wherein said hangar includes a main area for accommodating the fuselage and the main wing of the aeroplane, and an empennage area associated with said main area for accommodating an empennage, said empennage area having a greater height and a smaller width than said main area and being widthwise divided into two sections.

* * * * *